March 4, 1969 R. H. PFREHM 3,430,489
MODIFIED TURBINE MASS FLOW METER
Filed Jan. 30, 1967
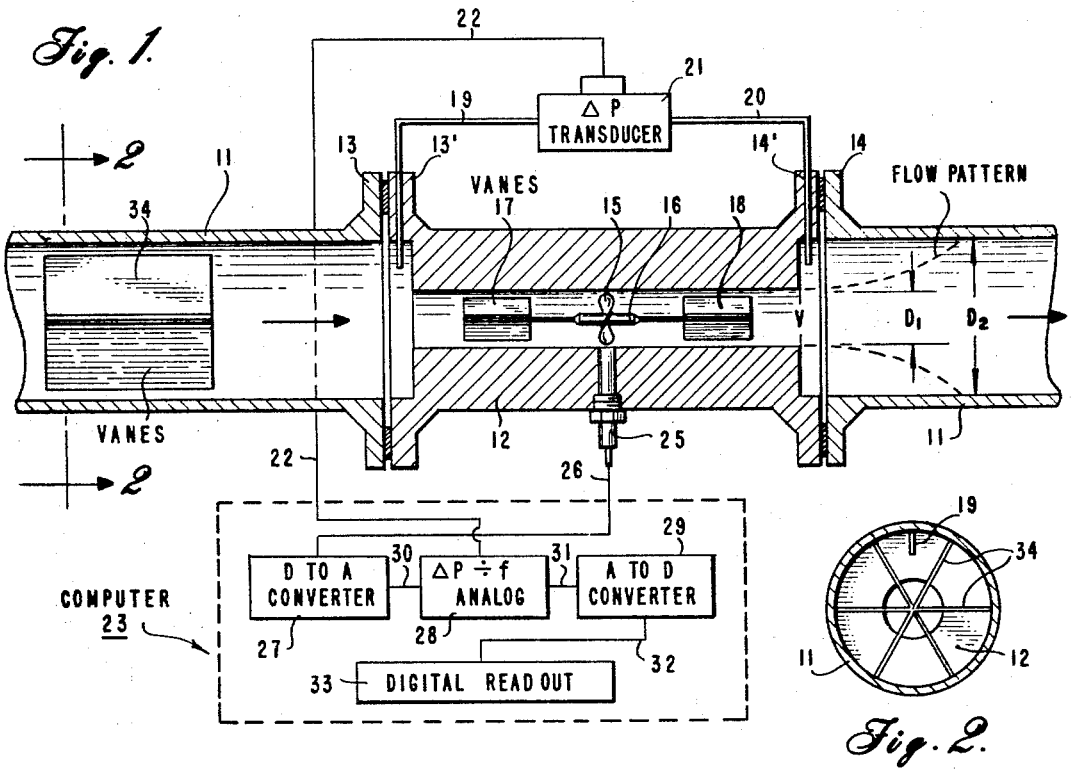
Fig. 1.
Fig. 2.
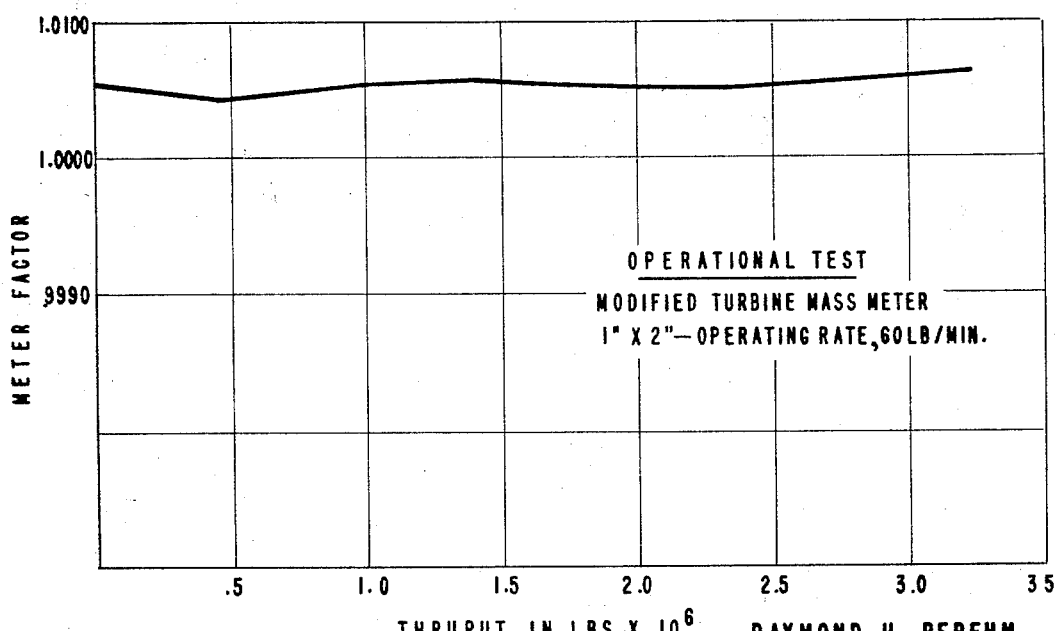
Fig. 3.
RAYMOND H. PFREHM,
INVENTOR
BY
ATTORNEY.

United States Patent Office 3,430,489
Patented Mar. 4, 1969

3,430,489
MODIFIED TURBINE MASS FLOW METER
Raymond H. Pfrehm, Houston, Tex., assignor to Esso Research and Engineering Company
Filed Jan. 30, 1967, Ser. No. 612,703
U.S. Cl. 73—231         7 Claims
Int. Cl. G01f 1/06

ABSTRACT OF THE DISCLOSURE

A tubular bore choke is arranged in a conduit through which fluid is flowed with a turbine located in the choke; differential pressure sensing means upstream and downstream of the choke, the downstream sensing means being located in the horizontal cross-sectional plane of the vena contracta, a digital output sensor for the turbine, and a computer means to which said several sensing means are connected, allows obtaining of a quotient proportional to mass flow rate which is converted to digital output in terms of mass throughput.

BACKGROUND OF THE INVENTION

Field of the invention

The present invention is directed to a mass flow meter. More particularly the invention is concerned with measurement of the mass flow of fluids and throughput in a conduit. In its more specific aspects, the invention is concerned with apparatus for accurately measuring mass flow rate and throughput of fluids such as gases and the like flowing in a conduit.

Description of the prior art

It is known to measure mass flow of fluids using a spaced apart turbine and orifice. It is also known to use a turbine arranged in a venturi in measuring mass flow where differential pressure and velocity are simultaneously sensed. However, the prior art devices employing a turbine in a venturi are inaccurate due to the configuration and geometry of the venturi and due to the turbine interrupting the flow patterns and pressure differential in the venturi. The present invention allows the obtaining of accurate measurement of mass flow and throughput not possible with prior art devices without the necessity of providing a pressure pick-up within the choke.

Prior art considered relative to the present invention is as follows: U.S. 2,772,567.

SUMMARY

The present invention may be briefly described and summarized as involving apparatus for measuring mass flow and throughput of a fluid flowing in a conduit in which a tubular bore choke having a substantially constant diameter throughout its length is arranged. The ends of the tubular bore choke form sharp edges perpendicular to the bore. Located in the bore of the choke is a turbine which is provided with means for sensing the digital output of the turbine, this sensing means being arranged in the wall of the tubular bore choke. First and second pressure sensing means up and downstream respectively of the tubular bore choke are connected to a differential pressure analog transducer which in turn is connected to a computer means; the downstream pressure sensing means is arranged in the horizontal cross-sectional plane of the vena contracta of the stream emerging from said tubular bore choke. The means sensing the digital output of the turbine is also connected to the computer means which converts the digital output to an analog function and divides the latter into the differential pressure analog function to obtain a quotient which is proportional to mass flow rate and which is converted to a digital output of the computer means and registered in terms of throughput of fluid flowed through said conduit.

BRIEF DESCRIPTION OF THE DRAWING

The present invention will be further illustrated by reference to the drawing in which
FIGURES 1 and 2 are partial cross-sectional views of the mass flow meter and the computer means; and
FIGURE 3 is a plot of data showing the stability of the apparatus of the present invention.

DESCRIPTION OF THE PREFERRED EMBODIMENT AND BEST MODE IN CONJUNCTION WITH THE DRAWING

Referring now to the drawing and particularly to FIGURES 1 and 2 which illustrate a preferred embodiment, numeral 11 designates a conduit such as a pipeline through which a fluid such as hydrocarbon gas or the like is flowing. Arranged in the conduit 11 is a tubular bore choke 12 which is removably connected into conduit 11 by bolted flange means 13, 13' and 14, 14'. Tubular bore choke 12 is provided with a turbine 15 on a shaft 16. Straightening vanes 17 and 18 are arranged up and downstream, respectively, of turbine 15.

Arranged in flanges 13' and 14', respectively, are conduits 19 and 20 which connect to a differential pressure transducer 21 which in turn is electronically connected by lead 22 to computer means 23.

Arranged in the wall 24 of the choke 12 is digital pick-up 25 which is electronically connected to computer means 23 by lead 26.

Computer means 23 includes means 27 for converting the digital pick-up to an analog function, means 28 for dividing the differential pressure analog by the analog function of the digital pick-ups, and means 29 for converting the quotient of the division to a digital read-out in terms of mass throughput of fluid flowed through the conduit. Means 27, 28, and 29 are connected by leads 30 and 31 and lead 32 connects means 29 to the digital read-out means 33 of the computer means 23.

Computer means 23 suitably may comprise a computer such as made available to the industry by Daniel Industries, Inc. of Houston, Tex., and designated as Mass Flow Computer, and the like which will perform the several functions which have been described.

It is to be noted that straightening vanes 34 are arranged in conduit 11 upstream from choke 12.

The conduit 20 is arranged in the horizontal cross-sectional plane of the vena contracta of the tubular bore choke 12. The diameter of the tubular bore choke is represented in the drawing as $D_1$ while the diameter of the conduit 11 is represented by $D_2$. The ratio of $D_1$ to $D_2$ should be within the range from about 0.35 to 0.5 for best results.

The tubular bore choke 12 should have a length within the range from about 4 to 6 diameters of the bore of the tubular bore choke and said bore must be of substantially constant diameter throughout its length with a wall that is not interrupted by a pressure pick-up. Moreover, the ends of the choke must have sharp edges such that the ends are perpendicular to the bore.

The turbine 15 is arranged approximately mid-point of the length of the bore and the straightening vanes 17 and 18 may be immediately upstream and downstream of turbine 15. The straightening vanes 34 may be spaced upstream of the tubular bore choke 12 a distance approximately 5–7 diameters of the bore of the tubular bore choke 12.

The vena contracta of the tubular bore choke 12 is represented in the drawing as V and the fluid emerging from the tubular bore choke 12 describes a pattern or jet as shown by dotted lines in the drawing.

In employing the apparatus of FIGURE 1, fluid such as gas is flowed through the conduit 11. The output of the turbine is an electrical pulse, the frequency of which is proportional to the velocity. Differential pressure $\Delta P$ developed across the choke 12 is proportional to the velocity head $V^2\gamma$. The computer means 23 reduces the digital output of the turbine to an analog function which is then divided into the analog function of the differential pressure. The quotient of this division is adjusted by a meter factor index and converted to a digital output in terms of total pounds throughput.

The Beta ratio ($D_1$ to $D_2$) should be in the range of 0.35 to 0.5 for linear meter performance. When this ratio is used with a 0″ to 200″ differential pressure transducer a flat curve is provided and at the same time the best velocity range for the turbine 15 from about 50 to about 250 feet per second is obtained.

A meter having a 1-inch choke with a turbine in it such as shown in FIGURE 1 was used in a 2-inch conduit over a period of over three months with throughputs of over three million pounds of gas. FIGURE 3 illustrates the stability of this particular apparatus of the present invention. Thus, as shown by the data, the meter factor varied from 1.004 to 1.0065; with most operations the factor was at 1.005+. These data illustrate the remarkable accuracy and stability of the apparatus of the present invention.

The nature and objects of the present invention having been completely described and illustrated and the best mode and embodiment contemplated set forth what I wish to claim as new and useful and secure by Letters Patent is:

1. Apparatus for measuring the mass flow and throughput of a fluid flowing in a conduit which comprises:
   a tubular bore choke arranged in said conduit having a length within the range from about 4 to about 6 diameters of said bore;
   said choke having a substantially constant diameter throughout the length of its bore and having a ratio of the diameter of said choke to the diameter of said conduit within the range of 0.35 to 0.5;
   the ends of said tubular bore choke being perpendicular to its bore and forming sharp edges;
   a turbine arranged in said bore;
   first means in said conduit for sensing pressure ahead of said choke;
   second means in said conduit for sensing pressure downstream of said choke in the horizontal cross-sectional plane of the vena contracta of said choke;
   said first and second pressure sensing means sensing the differential pressure across said tubular bore choke as an analog function thereof;
   means for sensing the digital output of said turbine; and
   computer means connected to said first and second pressure sensing means and to said output sensing means for reducing the digital output of said output sensing means to an analog function and then dividing said latter analog function into the analog function of the differential pressure; whereby a quotient is obtained which is proportional to mass flow rate and converted to a digital output of said computer means which latter output is registered in terms of mass throughput of said fluid through said conduit.

2. Apparatus in accordance with claim 1 in which said conduit is provided with straightening vanes ahead of said tubular bore choke.

3. Apparatus in accordance with claim 1 in which said tubular bore choke is provided with straightening vanes ahead and behind said turbine.

4. Apparatus in accordance with claim 1 in which said tubular bore choke is removably arranged in said conduit.

5. Apparatus in accordance with claim 1 in which said first and second pressure sensing means are connected to a differential pressure analog transducer means which in turn is connected to said computer means.

6. Apparatus in accordance with claim 1 in which said means for sensing the digital output is arranged in the wall of the tubular bore choke.

7. Apparatus for measuring the mass flow and throughput of a fluid flowing in a conduit which comprises:
   a tubular bore choke arranged in said conduit having a length within the range from about 4 to about 6 diameters of said bore;
   said choke having a substantially constant diameter throughout the length of its bore and having a ratio of the diameter of said choke to the diameter of said conduit within the range of 0.35 to 0.5;
   the ends of said tubular bore choke being perpendicular to its bore and forming sharp edges;
   a turbine arranged in said bore;
   first means in said conduit for sensing pressure ahead of said choke;
   second means in said conduit for sensing pressure downstream of said choke in the horizontal cross-sectional plane of the vena contracta of said choke;
   said first and second pressure sensing means sensing the differential pressure across said tubular bore choke;
   means for sensing the output of said turbine; and
   computer means connected to said first and second pressure sensing means and to said output sensing means for dividing the output of said output sensing means into the differential pressure; whereby a quotient is obtained which is proportional to mass flow rate.

References Cited

UNITED STATES PATENTS

| | | | |
|---|---|---|---|
| 874,667 | 12/1907 | Gehre | 73—205 |
| 967,953 | 8/1910 | Morris | 73—205 |
| 2,772,567 | 12/1956 | Boden et al. | 73—231 |
| 2,975,635 | 3/1961 | Kindler et al. | 73—231 X |
| 3,115,777 | 12/1963 | Hochreiter | 72—231 X |
| 3,307,396 | 3/1967 | Griffo | 73—231 |

RICHARD C. QUEISSER, *Primary Examiner.*

EDWARD GILHOOLY, *Assistant Examiner.*

U.S. Cl. X.R.

73—205